3,137,647
PURIFICATION OF BORON
James C. Schaefer, North Royalton, and Ernest C. Schmidt, Euclid, Ohio, assignors to Walter M. Weil, Shaker Heights, Ohio
No Drawing. Filed Nov. 2, 1961, Ser. No. 149,510
3 Claims. (Cl. 209—2)

This invention relates to a method for purifying and upgrading elemental boron and, more particularly, to a method for reducing carbon and iron impurities present in a mass of finely divided elemental boron, such, for example, as the boron product of fused salt electrolysis, as described and claimed in U.S. Patents 2,572,248, 2,572,249, 2,918,417, and 2,984,605 of Hugh S. Cooper.

Heretofore, no effective procedure has existed for the removal of difficultly soluble impurities, such as carbon and iron, from elemental boron, in which these impurities are commonly found in small, yet detrimental amounts. The only way to produce high purity elemental boron consistently was by careful control of the reaction conditions, of the quality of the starting materials, and of the character of equipment employed and materials of which such equipment was constructed.

Carbon is one of the principal impurities in elemental boron since carbon, in some form, is present in most boron-making processes. For example, the production of elemental boron by fused salt electrolysis generally requires the use of carbon as a material of construction of the electrolytic cell itself and/or as the anode. In some electrolytic cells, the graphite pot holding the fused salts serves as the anode. Other processes for producing boron utilize boron carbide anodes as the source of the boron.

Iron, as a contaminant of elemental boron produced by any of the presently practiced commercial processes, is practically always found in the product in objectionable, though small amounts. It is generally attributable to iron impurities in the starting materials, such as components of the fused salt baths employed in electrolytic processes, or to pick-up from the equipment used, or to both.

The objects of the present invention are to provide a low cost, convenient procedure for purifying and upgrading elemental boron and, particularly, a procedure for removing impurities such as carbon and iron, in either elemental or combined form, from the finely divided products of boron-making processes. Examples of such impurities are free carbon, boron carbide, iron carbide, and, in some instances, apparently, other iron compounds.

In accordance with the method of the invention, impure, finely divided, elemental boron is treated with a mixture of water and a very small amount of oleic acid, with agitation, to entrain in the liquid appreciable quantities of the impurities in the impure boron. Thereafter, the liquid and entrained impurities are removed, and the boron is finally washed with water and/or some other suitable solvent to remove additional impurities still intermingled therewith.

The proportion of oleic acid to water is very small. The amount required depends, in part, upon the purity of the boron material to be purified and upon the proportion of boron to the liquid mixture. Generally, the oleic acid will comprise at least about 0.005% by volume of the water and preferably will be between about 0.007% and 0.05% of the water employed. If less than about 0.005% is employed, there will be insufficient oleic acid in the mixture to separate appreciable proportions of the impurities, while if the proportion of oleic acid is significantly above 0.05%, a substantial proportion of the boron may be lost by entrainment in the oleic acid layer.

The amount of water employed with the oleic acid in the purification of the boron is not critical so long as there is sufficient water present to completely cover the boron particles. Generally the amount of water by volume should be about equal to or greater than the amount of boron undergoing treatment. Advantageously, a quantity of water sufficient to provide a substantial layer of supernatant liquid is employed. The temperature of the water appears to have little or no effect, and the normal range of tap water temperatures is suitable.

During the oleic acid treatment, as pointed out above, the mixture of boron particles, oleic acid, and water is agitated. This brings the oleic acid into intimate contact with the boron particles. After the agitaiton is terminated, the boron particles will settle to the bottom of the vessel, and the impurities and oleic acid will rise to the surface of the liquid.

After the boron has settled to the bottom, the supernatant liquid may be removed by known methods, such as by decantation. The boron is then washed with water or solvent to remove traces of impurities intermingled with the boron particles. Advantageously, the boron is wished with hot water, followed by alcohol or carbon tetrachloride washes. The alcohol is particularly useful for washing the boron since it not only removes impurities but also absorbs water from the surfaces of the boron particles.

Where the boron starting material contains a large proportion of impurities, it is advantageous to repeat the oleic acid treatment one or more times to insure a high degree of impurity removal.

Various aspects of the invention will be more fully understood from the following examples and the accompanying discussion.

EXAMPLE I

About 1000 grams of boron of —325 mesh particle size, analyzing 98.30% boron, 0.89 carbon, and 0.36% iron, were mixed with 1 cc. of oleic acid and 3500 cc. of water at an ambient temperature. The resulting mixture was then vigorously agitated with a small paint mixer attached to a ¼ inch electric hand drill. The mixer shaft mounted in the hand drill had four segmental, curved blades equally spaced about its lower end, but other types of mechanical agitation can be used with equal effectiveness. After the mixer had been operated for about 10 minutes, the mixture was allowed to stand for approximately ½ hour. Within a few minutes after the mixer had stopped, the formation of separate layers in the suspension was observed. After ½ hour, the powdered boron appeared to be completely settled. At this time, three distinct layers were observed in the mixture. The top layer appeared to contain the oleic acid and entrained impurities; the middle layer appeared to be clear water; and the bottom layer was powdered boron and water.

The top layer and a small part of the middle layer were decanted, and the remaining mixture was again vigorously agitated. The agitation was continued for about 10 minutes, after which the mixer was removed, and the liquid was permitted to stand for about ½ hour. At the end of this period, a much smaller layer was observed at the top of the liquid. The upper layer was then decanted and the mixing and settling operations repeated five times until no layer could be distinguished on the surface of the mixture.

The mixture was then filtered, and the powdered boron recovered from the filter was washed with hot water and filtered again. Thereafter, the boron was washed twice with ethyl alcohol and vacuum dried.

The dried boron powder, which weighed 955 grams, was analyzed and found to have a purity of about 99.40%.

The carbon content was reduced to 0.14% and the iron to 0.32%. Thus, the carbon content of the boron starting material was reduced to less than one-fifth of the initial amounts, and the iron content was appreciably reduced, while the boron purity was increased 1.10%.

EXAMPLE II

The following is a tabulation showing the purification obtained when the procedure of Example I was employed with other boron samples of —325 mesh particle size:

RUN A

|  | Percent Boron | Percent Carbon | Percent Iron |
|---|---|---|---|
| Starting material | 98.75 | 0.70 | 0.35 |
| After treatment | 99.45 | 0.09 | 0.22 |
| Improvement | +0.70 | −0.61 | −0.13 |

RUN B

|  | Percent Boron | Percent Carbon | Percent Iron |
|---|---|---|---|
| Starting material | 99.34 | 0.63 | 0.11 |
| After treatment | 99.50 | 0.33 | 0.13 |
| Improvement | +0.16 | −0.30 | +0.02 |

RUN C

|  | Percent Boron | Percent Carbon | Percent Iron |
|---|---|---|---|
| Starting material | 99.30 | 0.54 | 0.12 |
| After treatment | 99.40 | 0.35 | 0.12 |
| Improvement | +0.10 | −0.18 | 0 |

RUN D

|  | Percent Boron | Percent Carbon | Percent Iron |
|---|---|---|---|
| Starting material | 99.25 | 0.63 | 0.10 |
| After treatment | 99.45 | 0.36 | 0.12 |
| Improvement | +0.20 | −0.27 | +0.02 |

Where the iron content was not lowered or appeared to rise slightly, on a percentage basis, this appears to have been due to the iron being so closely bound to the boron as to resist separation. The small increases are within the expected range of experimental error. Since there was no opportunity for an increase in the amount of iron present, the effect of the invention on the iron impurities was nil in Runs B, C, and D, where the initial iron content was very low. This is consistent with experience in many tests, i.e., the invention is effective in reducing impurities from relatively high values down to lower values in the range of around .10 to .35% but has relatively little or no effect in most instances where the initial concentration of a contaminant is much below .30% or so. This varies, of course, with the character of the impurities and the care used in carrying out the invention, as indicated by the following additional examples.

EXAMPLE III

The products obtained from Runs B, C, and D of Example II were combined and treated a second time according to the procedure of Example I. The starting boron material analyzed 99.45% boron, 0.35% carbon, and 0.12% iron. After treatment, the product analyzed 99.60% boron, 0.12% carbon and 0.12% iron.

EXAMPLE IV

Approximately 4500 grams of boron of —325 mesh particle size, having an analysis of 97.00% boron, 2.03% carbon and 0.93% iron, were purified according to the procedure of Example I, except that 2.3 cc. of oleic acid and 16 liters of water were employed. The final boron product analyzed 99.01% boron, 0.25% carbon and 0.55% iron.

The following example shows the deleterious loss of boron which results when excess quantities of oleic acid are employed.

EXAMPLE V

The procedure of this example was the same as Example I, except that 500 grams of boron of —325 mesh particle size, analyzing 98.65% boron, 0.62% carbon, and 0.33% iron, were mixed with 5 cc. of oleic acid and 3500 cc. of water. After treatment according to the procedure of Example I, 350 grams of the final product were obtained. This product analyzed 99.30% boron, 0.11% carbon and 0.24% iron. While the proportions of the carbon and iron impurities in the sample were substantially decreased, the employment of 0.14% oleic acid in this case resulted in approximately a 30% loss of boron, as compared with less than 5% loss of boron in Example I.

EXAMPLE VI

In order to demonstrate the effectiveness of the invention in removing boron carbide, a form in which carbon contamination is commonly found in substantial quantity in boron products, the procedure of Example I was repeated using 10 grams of boron carbide of about 200 mesh particle size (rather than elemental boron). The boron carbide was mixed and agitated with 3,500 cc. of water and 1 cc. of oleic acid. After a brief settling period, all of the boron carbide rose to the surface and remained suspended even after a period of 20 hours, at which time it was decanted off, leaving a residual quantity of the liquid with no boron carbide remaining.

From the foregoing, it will be appreciated that the present invention provides a new and improved method for purifying upgrading elemental boron and particularly provides a method for substantially reducing the proportions of carbon and iron impurities generally present in boron products. Moreover, the method of the present invention permits the purifying and upgrading of elemental boron through a procedure which is simple and relatively low in cost. Since only very small amounts of oleic acid are required and oleic acid is not expensive (about $5 per gallon), the method of the invention permits the purification of boron for a fraction of a cent per kilogram as far as the oleic acid reagent cost is concerned. Except for the settling time required, the other operations (washing, filtering, and drying) are required when the invention is not employed and their cost is not attributable to the invention.

It will be apparent from the above description that various modifications of the methods described can be made within the scope of the invention. Therefore, the invention is not intended to be limited to the details of the specific method described herein, except as may be required by the appended claims.

What is claimed is:

1. A method for purifying a mass of finely divided particles of elemental boron, containing significant amounts of impurities selected from the group consisting of iron, carbon, boron carbide, and iron carbide, comprising the steps of vigorously agitating a mixture consisting essentially of said finely divided boron particles, water, and oleic acid, and separating purified boron particles from said impurities and from the liquid medium of the mixture, the amount of oleic acid being between about 0.005% and 0.05% of the water by volume.

2. A method for purifying a mass of finely divided particles of elemental boron containing significant amounts of impurities selected from the group consisting of iron, carbon, boron carbide, and iron carbide, comprising the steps of vigorously agitating a mixture consisting essentially of said finely divided boron particles, water, and a very small amount of oleic acid, allowing purified boron particles to settle, separating the settled boron particles from the mixture, washing the separated boron particles with a washing liquid, and removing the washing liquid from said washed boron particles.

3. A method for purifying a mass of finely divided particles of elemental boron containing significant amounts of impurities selected from the group consisting of iron, carbon, boron carbide, and iron carbide, comprising the steps of vigorously agitating a mixture consisting essentially of said finely divided boron particles, water, and oleic acid, allowing purified boron particles to settle, separating the settled boron particles from the mixture, washing the separated boron particles with a washing liquid, and removing the washing liquid from said washed boron particles, the amount of oleic acid being between about 0.005% and 0.05% of the water by volume.

References Cited in the file of this patent

UNITED STATES PATENTS

| | | |
|---|---|---|
| 689,070 | Elmore | Dec. 17, 1901 |
| 2,866,688 | Mazza | Dec. 30, 1958 |